Patented Dec. 28, 1926.

1,612,742

UNITED STATES PATENT OFFICE.

EARL B. PUTT, OF NEW YORK, N. Y.

ACTIVE-CHLORINE PREPARATION.

No Drawing.    Application filed March 22, 1926.  Serial No. 96,663.

This invention relates to active chlorine preparations and methods of making the same, and more particularly to an active chlorine preparation provided with cineol for the purpose of imparting a distinctive flavor and odor and substantially masking the disagreeable odor of the chlorine.

An object of the invention is to provide a composition containing active chlorine and capable of use as a disinfectant and healing agent in which the disagreeable odor normally present in a chlorine preparation is masked.

A further object of the invention is the provision of a process of preparing an active chlorine preparation in which the odor of the chlorine is removed.

The principal difficulty in overcoming the objectionable odor of chlorine in active chlorine preparations is due to the fact that such preparations are deliberately used as deodorants and destroy most odorous substances. It is therefore essential that the material used for the purpose of masking the chlorine odor must be a substance having the property of being resistant to the destructive action of chlorine compounds, and at the same time, capable of furnishing an odor and flavor of its own which will destroy or mask the chlorine odor and flavor of the compound. In the preparation of such chlorine compounds it is the usual practice to preserve certain conditions of alkalinity and light exposure under which stable compounds are obtained. Thus solutions of sodium hypochlorite in water with sodium chloride and small quantities of sodium carbonate and calcium salts, or solutions or suspensions of organic chlorine compounds such as sodium paratoluenesulphonchloramide, known to the trade as chloramine-T or other organic substances which contain active chlorine, have been employed. Such suspensions or solutions may, in the case of the organic compounds, be neutral or slightly alkaline stearates prepared in the form of cerates or creams for local application, or solutions in a non-reducing solvent in which the chlorine compound is present.

I have found that cineol, a substance obtained from oil of eucalyptus and from other sources, imparts a distinctive odor and flavor to such preparations substantially masking the disagreeable odor due to the presence of chlorine, without materially reducing the active chlorine compound. This substance, which has the formula $C_{10}H_{18}O$, may be added to the preparation in any suitable manner to obtain a substance that may be applied or used in substantially the same manner that similar active chlorine preparations are now applied or used and substantially the same results may be obtained without the unpleasantness of the chlorine odor and flavor.

In the preparation of a cream or paste I heat 25 parts of stearic acid, 2 parts of potassium hydroxid, and 73 parts of water in a steam jacketed vessel until a thick smooth cream or paste is obtained. This paste is then cooled to a temperature of substantially 25° C., and to 95 parts of the paste 5 parts of sodium paratoluenesulphonchloramide, or other organic compound capable of yielding active chlorine and permanent in slightly alkaline or neutral fatty acid mixtures, is added. The mixture is then stirred to thoroughly mix it and 5 parts of cineol added thereto. The cineol is thoroughly incorporated in the mixture producing a cream which is ready for use and may be packed in collapsible tubes of nonreducing material or other suitable containers. Such a cream is effective in the treatment of ivy poisoning and has the added advantage of the cooling and soothing effect produced by the cineol which acts as an additional healing agent.

In the preparation of a flavored solution .5 cc. of cineol is added to 100 cc. of a solution of sodium hypochlorite containing approximately 1 gram of available chlorine together with sodium chloride, sodium carbonate and other calcium salts. Such a solution must be kept in brown or green glass bottles in a cool place. The solution is comparatively stable and tests show that when kept for a period of six months under proper conditions the chlorine content for 100 cc. showed a reduction from 1.045 grams at the beginning to 1.039 grams at the end of six months. In such a solution the odor of chlorine is completely masked in the original solution and largely so on dilution.

As a further modification sodium acetate in less than 5 per cent may be added to such solution and this increases, to some extent, the amount of cineol that passes into solution and modifies the taste of the preparation when diluted with water.

In the preparation of pastes or creams of the type described the proportion of the ingredients may be widely varied to produce creams of different consistency appropriate to different temperature and climatic conditions. Stearic acid or similar nonreducing material may be employed alone to obtain a preparation which does not dissolve in water nor provide water soluble acidity which would break up the chlorine compound.

While I have described in detail the preferred practice of my process, it is to be understood that the details of procedure and proportions of ingredients may be widely varied, and that known chemical equivalents may be employed in place of the materials mentioned, without departing from the spirit of the invention or the scope of the subjoined claims.

I claim:

1. A substantially stable chlorine composition of the character described comprising an active chlorine-yielding material and cineol in a form adapted to mask the chlorine odor thereof.

2. A substantially stable chlorine composition of the character described comprising a major portion of an active chlorine material and a minor portion of cineol substantially free from modifying constituents but in an amount sufficient to mask the chlorine odor thereof.

3. A substantially stable chlorine compound of the character described comprising a water soluble chlorine-yielding material, a soluble salt of an alkaline earth metal, and cineol in a form adapted to mask the chlorine odor of said chlorine-yielding material.

In testimony whereof I affix my signature.

EARL B. PUTT.